March 5, 1957 — G. W. BODAMER ET AL — 2,784,158
MULTIPLE ION EXCHANGE MEMBRANE ELECTRODIALYSIS CELL Filed May 25, 1954 — 2 Sheets-Sheet 1

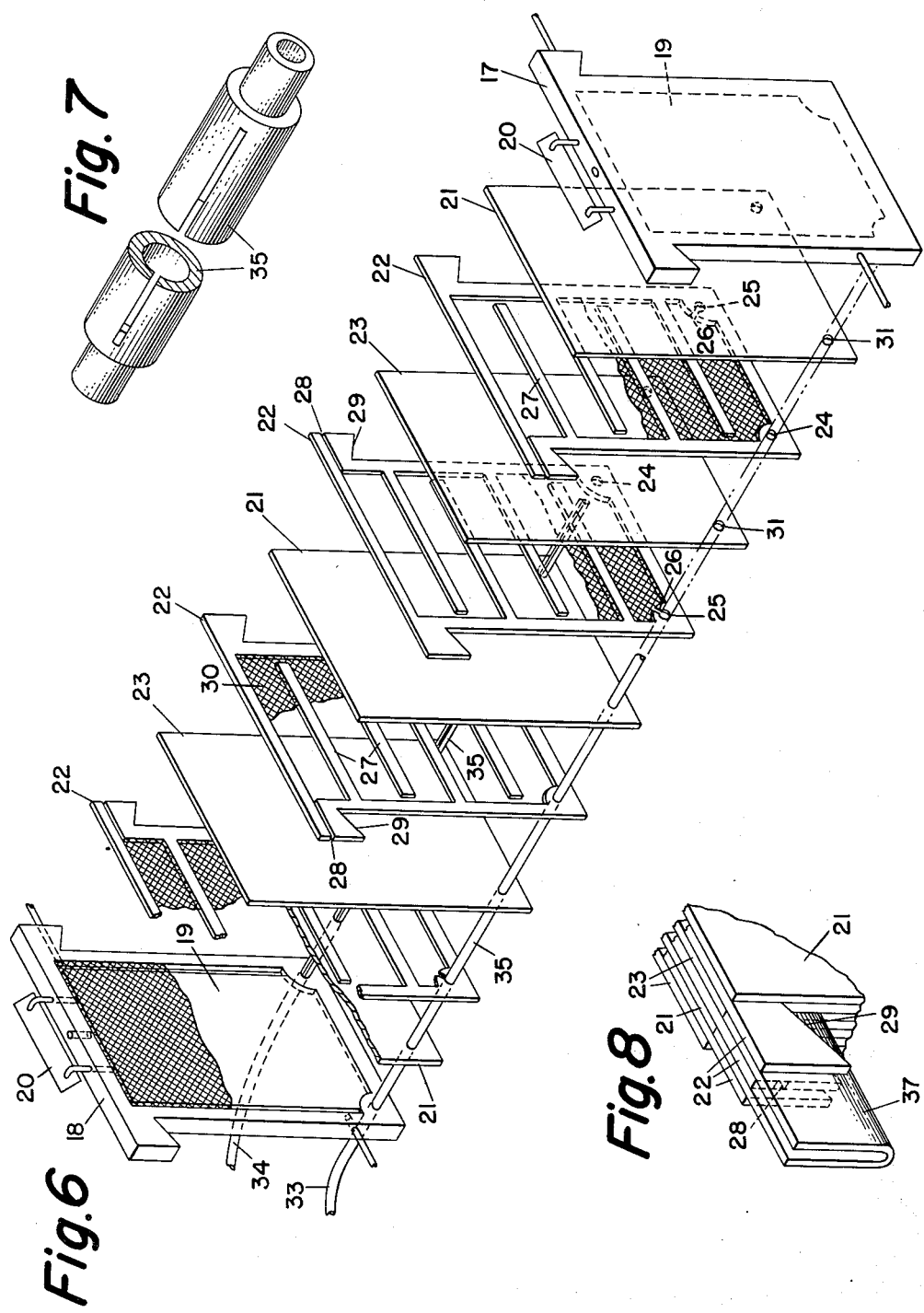

United States Patent Office 2,784,158
Patented Mar. 5, 1957

2,784,158

MULTIPLE ION EXCHANGE MEMBRANE ELECTRODIALYSIS CELL

George W. Bodamer, Cheltenham, Pa., and Charles J. Prizer, Moorestown, N. J., assignors to Rohm & Haas Company, Philadelphia, Pa., a corporation of Delaware Application May 25, 1954, Serial No. 432,122

2 Claims. (Cl. 204—301)

This invention relates to a multiple ion exchange membrane electrodialysis cell for removing salts and other ionizable substances from solutions. It relates particularly to a high capacity electrodialysis cell for the treatment of natural waters having a salt content above what is normally regarded as fresh water in order to convert the salt water to one that is fit for drinking, irrigation, or steam generation.

The theory of a multiple ion exchange membrane electrodialysis cell has heretofore been well understood (Meyer and Straus, Helvetica Chimica Acta, vol. 23 (1940), pages 795 to 800) and proposals have been made for apparatus that applies the principles involved in a practical way (British Patent No. 694,223 published July 15, 1953). However, in attempting to construct suitable apparatus for processing large volumes of water at low costs for both equipment and power, difficulties have been encountered. In copending application Serial No. 336,282, filed February 11, 1953 now abandoned, apparatus is described in which both the concentration stream and the dilution stream of a multiple ion exchange membrane electrodialysis cell are passed in series through alternate compartments of the cell. A cell of this construction has the advantage of assuring uniform flow in all units of each series but the disadvantage that there is a high pressure drop between the first and last units of each series. The pressure required to cause solution to pass through at a high rate is therefore a limiting factor on the capacity of this type cell. A cell constructed for parallel flow through the various units would not have this disadvantage but in such a cell extreme care must be taken to assure substantially equal flow through all units of the concentration stream and particularly through all units of the depletion stream. It can be readily seen that, should one chamber of the depletion stream become clogged or reduced in flow, the electrical resistance of the cell would be substantially increased whereby the electric current passing through the cell would be reduced and the salt transferred from depletion stream to concentration stream lessened.

It is a well known principle of physics that in any given substance the resistance to an electric current is inversely proportional to the length of the path through which the current must flow. It is therefore desirable to have the chambers of a multiple ion exchange membrane electrodialysis cell, particularly the chambers of the depletion stream, as thin as practical. The need for thin cells, however, presents a difficult problem of getting liquid into and out of the chambers while avoiding leakage of liquid from one stream to the other.

Another essential feature of an efficient multiple ion exchange membrane electrodialysis cell is that there be uniform flow across the entire exposed membrane surface. Lack of a uniform flow will cause areas to form in the depletion series which have become depleted of their salt and areas to form in the concentration series that are unduly concentrated. To avoid such areas each unit of each series should be provided with suitable means to assure the uniform passage of solution over all exposed areas of the membranes.

It is also known that, when an electric current passes from a solid medium into a solution of electrolyte and then to another solid medium, a phenomenon known as "concentration polarization" occurs in the liquid phase adjacent the interface (Quarterly Reviews, vol. 3 (1949), pages 101–104). This phenomenon occurs at electrodes because the current passing into or out of the solution is due to ions of only one kind being charged or discharged at the electrode whereas the current in the solution is carried by both kinds of ions present. This change in the proportion of the total current being carried by the ions of one charge results in there being formed in the solution adjacent the electrode a layer which may be highly concentrated or substantially depleted of ionizable material. In cells containing ion exchange membranes this same phenomenon occurs by reason of the current in the membrane being carried by ions of only one charge whereas in the solution it is carried by ions of both charges. It is known that the effects of concentration polarization are overcome by a turbulent flow which disrupts the surface layer of solution.

The object of this invention is to provide a multiple ion exchange membrane electrodialysis cell which, operating on the principle of parallel flow, provides a means for treating large volumes of solution to be deionized in simple, low cost equipment with economical use of electric current.

This object is accomplished by apparatus of the type illustrated in the drawings in which:

Fig. 1 is a perspective view of a general assembly of apparatus within the scope of this invention;

Figs. 2, 3, 4, and 5 are separate perspective views of certain of the elements used in the assembly shown in Fig. 1;

Fig. 6 is a view in perspective showing the basic cell elements in spaced relationship one to another;

Fig. 7 is a slitted inlet element preferably used in the assembly; and

Fig. 8 illustrates how a stream from a single chamber may be segregated.

Figure 1:
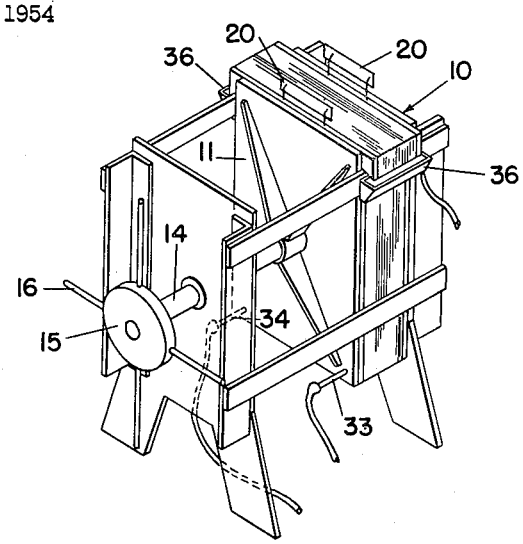

The general assembly shown in Fig. 1 comprises a supporting framework having a stationary end plate 10 and a movable end plate 11, between which the units of the cell are held. The movable plate 11 is controlled by the pressure screw 14 operated by the drive wheel 15 and handles 16.

Between the stationary end plate 10 and the movable end plate 11 are located the section elements of the cell in their relation to each other as more clearly shown in Fig. 6. These elements comprise the electrode sections 17 and 18, at either end abutting respectively the end plates 10 and 11, and a series of intermediate sections. The electrode sections each contain an electrode 19 of suitable shape and material. For instance, the anode may be a lead plate and the cathode an iron plate or both electrodes may be of graphite. The electrodes 19 are connected to a suitable source of direct current (not shown) through connectors 20.

The electrode sections 17 and 18 are provided each with an inlet near the bottom and an outlet at the top, so that liquid containing electrolyte can be passed through. Each is also provided with a vent for escape of gas formed therein during operation of the apparatus.

The elements of the intermediate sections are as follows: Next to electrode section 17 is located ion exchange membrane 21, followed by frame 22 with its inlet slit 26 at the lower right corner and its outlet 28 at the upper left corner as viewed in Fig. 6. This frame 22 is followed by ion exchange membrane 23 which in turn is followed by frame 22 with its inlet slit 26 at the lower left corner and its outlet 28 at the upper right corner as viewed in Fig. 6. This arrangement of membranes and frames in the same order is then repeated and may be repeated as often as desired. In the assembled cell the membranes must be alternately cation exchange membrane and anion exchange membrane and it is desirable that within each frame there be inserted a screen 30 of nonconducting material.

With particular reference to Figs. 2 to 6, inclusive, it will be noted that each frame 22 has adjacent its lower corners apertures 24 and 25, respectively, which extend therethrough. The aperture 25 communicates through slit 26 with the interior chamber formed by the frame and the adjacent membranes. An outlet 28 is provided at the upper portion of each frame. Each frame is provided with baffles 27 which direct the flow through the chamber uniformly over all exposed membrane surface.

The membranes 21 and 23 are provided adjacent their lower corners with apertures 31 and 32 which register with apertures 24 and 25 of abutting frames 22. When the elements are assembled in operative relation as shown in Fig. 1, there are formed two inlet manifolds, one on either side near the bottom of the assembly. These manifolds are connected, respectively, to the supply lines 33 and 34. Within the manifolds there may be the slitted pipe 35 made of non-conducting material. The slit in pipe 35 is made smaller in width than the width of the slit 26 which connects the apertures 25 with the interior of the chambers. The pipe therefore serves as a final screening means to prevent solid material from reaching the cell chamber. These pipes also serve as a means for holding the cell elements in alignment and help to equalize the distribution of solution through all the parallel units of each stream. They are positioned in the assembled cell so that the slit in the pipe registers with the slit 26 in the frames.

Troughs or gutters 36 as shown in Fig. 1 are provided on either side of the assembly under the outlets 28 of the frames 22, to serve as means for collecting on the one side the concentration stream and on the other the dilution stream coming from the alternate chambers of the cell. When the cell is operating at high flow rates, means, not shown, for deflecting the streams into the troughs are needed.

In Fig. 8 is illustrated a means for segregating the effluent from a single chamber. Each frame has extending ears 29 through one of which the exit port 28 extends. By placing the special chute 37, which has the same thickness as the membranes, about an ear containing an exit port, the flow through that port is segregated from the rest.

In a cell of this construction there are certain important elements of design to which particular attention should be paid. It is to be observed that both the feed port 26 and the exit port 28 of each chamber is a narrow slit having its length several times its width. This is necessary in order to prevent leakage of solution from one chamber to the next. The water-tightness of each chamber depends upon the membranes being held tightly against the cell frames. The feed and exit ports of the chamber, however, are areas at which the membranes are not supported and held firmly against the frames of the adjacent chambers. The ports, therefore, are areas at which leakage from one stream to the other can occur. This leakage will be substantial if short, wide ports are used. The danger of such leakage is reduced by having these ports as long, narrow slits. For similar reasons the baffles 27 are made sufficiently long to come to within a fraction of an inch of the opposite side of the frame. The baffles are effective for directing the flow of the solution through the chamber only if held firmly against the membrane. Since the opening around the end of the baffle is an area at which the membrane is not held firmly against the baffle of the next chamber, the opening should be kept as narrow as practical in order that the danger of solution in the adjacent chamber by-passing the baffle at this point be reduced to a minimum.

Another important feature of the cell design is the external collection of effluent streams. The importance of having uniform flow in all chambers of each stream has heretofore been explained. Where there is an internal manifold for collecting the effluent from each chamber, the flow through each chamber cannot be readily measured or analyzed. By the construction shown in the drawings the effluent from any chamber can be segregated from the rest of the stream and, in the event of the flow being too great or too little, adjustments can be made by varying the width of the slit 28.

The screens 30 are important elements of the cell construction. These screens serve the dual function of spacers in each chamber which prevent the adjacent membranes from coming in contact with each other and barriers which cause the solution passing through the chambers to assume a turbulent flow. The phenomenon of concentration polarization is substantially reduced by the presence of such screens in the chambers and, as is hereinafter shown, the capacity of the cell may be more than doubled by their presence.

In the operation of the unit the solutions being treated enter through the supply lines 33 and 34. The feed from line 33 passes upward through one set of alternate chambers and passes out of the cell into the trough 36 on the opposite side. Similarly, the feed from line 34 passes upward through the other set of alternate chambers and passes out of the cell into the other trough 36. As the two streams pass through the cell, a direct electric current is caused to pass from electrode to electrode across all chambers. Anions are thereby attracted to the anode and cations to the cathode. Solution passing through the alternate chambers that have cation exchange membranes on the cathode side and anion exchange membranes on the anode side will lose electrolyte by virtue of the ions passing through the membranes to the adjacent chambers. This series of chambers will therefore comprise the depletion stream. Since the membranes block the passage of ions from those chambers having cation exchange membranes on the anode side and anion exchange membranes on the cathode side, the stream passing through this series becomes more concentrated in electrolyte.

The cation exchange and anion exchange membranes used are preferably made in accordance with the disclosures of the United States patents of George W. Bodamer No. 2,681,319 and No. 2,681,320, granted June 15, 1954.

The cell frames can be conveniently die-cut from polyethylene sheets and Saran plastic screening is appropriate for the element 30. It is desirable that the cell frames and the screen be of substantially the same thickness which may vary from 15 mils to ⅛ inch. Very satisfactory results have been obtained with frames and screens 30 mils in thickness. The exposed surface of the electrodes 19 are also covered with screening and the electrodes are held firmly against the covering screen and adjacent membrane in order that sufficient pressure is exerted over the surface of the membranes to hold them firmly against the baffles 27. Suitable narrow vertical grooves may be cut in the surface of the electrodes to permit the ready escape of the gas generated. Other means may be used to hold the membranes and baffles pressed together.

A feature of the cell design herein described is that the flow of liquid through the chambers may be regulated to provide substantial uniformity. This is done by adjusting the width of the opening of each exit port 28. When assembling the cell the opening of each exit port should be set fairly accurately at a uniform width. A one-eighth inch slit permits adequate flow without creating too high a back pressure. The wider the slit the greater the danger of contamination of one stream by leakage from the other stream past the unsupported membrane. After the cell is assembled, the flow through each chamber should be segregated and measured and the exit port openings suitably adjusted to compensate for variations. The openings may easily be made smaller by lightly striking the upper edge of the frame above the slit using for this purpose a tool that may be held against the edge of one frame only. To open the slits is less simple. Therefore, flow adjustments are best made by cutting down on those frames in which flow is high rather than attempting to increase the flow in frames where it is below average.

The drawings show only a few frames between the electrodes. In practice a considerably larger number would be used with from 50 to 300 frames in each stream being within the practical range. Present experience indicates that a voltage drop of from 2 to 4 volts per combined unit of one depletion frame and one concentrating frame is the most practical to use for the conversion of water containing 1600 p. p. m. salts as $CaCO_3$ to water having a salt content of approximately 300 p. p. m. or lower. If 440-volt direct current is available, the cell could conveniently contain from 100 to 200 such combined units.

Figure 2:
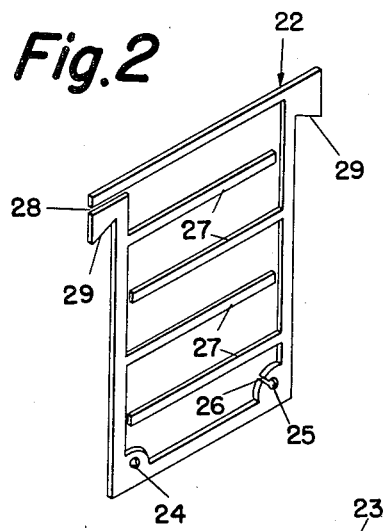
Figure 3:
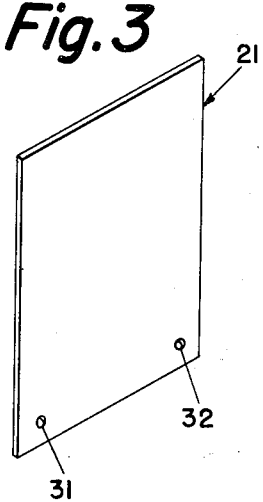
Figure 4:
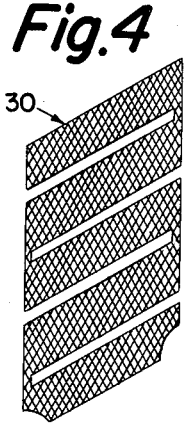
Figure 5:
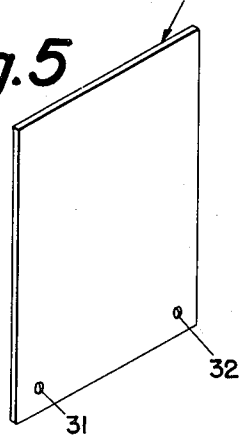

The invention may be illustrated by the following description of a practical operating unit:

The cell assembly was contained in a press of standard design for cells used in the electrolytic production of hydrogen and oxygen. The cathode was a ribbed cast iron plate and the anode sheet carbon. Both were cut to permit the ready escape of the gas generated. The electrode chambers were formed from polymerized methyl methacrylate and the intermediate frames from polyethylene sheets. The frames were cut as shown in Fig. 2. They measured 13 inches on each side and were 30 mils thick. All sides were ¾-inch wide and the four baffles ½-inch wide. The baffles extended to within ¼-inch of the opposite side of the frame. The intake ports were ¹⁄₁₆-inch wide and ½-inch long. The exit ports were approximately ⅛-inch wide and 1¾ inch long. Runs were made both with and without plastic screen in the chambers. The screen, when used, was approximately 30 mils thick and of a mesh customarily used as fly-screening. The cell contained ten depletion chambers and ten concentration chambers. The membranes were the kind described in the above-mentioned patents of George W. Bodamer in which polyethylene was the binder used. A cation exchange membrane was adjacent both the anode compartment and the cathode compartment. The feed pipes 35 were made of methyl methacrylate polymer, had an outside diameter of 1 inch, an inside diameter of ½-inch, and the slit was ¹⁄₃₂-inch wide. The anolyte was a 24% sodium chloride solution. The catholyte was sodium chloride solution of approximately 1600 p. p. m. as $CaCO_3$. The solution fed to both the concentration stream and the dilution stream was sodium chloride solution of the concentration given in the following table. This table gives data on the results obtained in representative runs made in the equipment. In these runs the flow rates and applied voltage were changed and in runs 1 to 5 the screening was omitted from the chambers.

These data are representative of what may be accomplished with a cell of the type described. They show that at constant voltage higher flow rates give lower quality water but higher current efficiency and that at constant flow rates higher voltage gives higher quality water and lower current efficiency. They also show that the presence of the plastic screening in the chambers increased the capacity of the cell when operating at the same voltage and quality of effluent by a factor of approximately 2½ (compare Runs 3 and 8) while at the same time substantially improving the current efficiency.

While the cell herein described has been designed and tested primarily for desalting natural waters, it is apparent that it and the principles upon which it is based are equally applicable to the removal of electrolytes from other solutions. In the above-mentioned application Serial No. 336,282 reference is made to various ways in which the multiple ion exchange membrane electrodialysis cell therein disclosed may be used in industry to remove unwanted electrolytes from solutions or to concentrate recoverable values in waste solutions. The cell herein described may be used in the same ways with such modifications, where desirable, as may be appropriate for the application of the described principles to the changed requirements.

We claim:

1. A multiple ion-exchange membrane electrodialysis cell adapted for separate parallel flow of the concentration and depletion streams, each in portions through alternate intermediate cell sections, which comprises an anode section, a cathode section, a plurality of intermediate sections formed by frames separated by single alternate cation- and anion-exchange membranes, each of said frames having a first slit and a second slit communicating with the interior of the frame, a first conduit communicating with the first slit in alternate frames, a second conduit communicating with the first slit in the remainder of said frames, said second slits in alternate frames extending outwardly in different directions to the exterior edges of the frames, to provide outlets for the unrestricted flow of effluent from each section, and troughs provided below said second slits in alternate frames, one on each side of the assembly for collection of freely falling effluent from said alternate intermediate cell sections.

2. A multiple ion-exchange membrane electrodialysis cell adapted for separate parallel flow of the concentration and depletion streams, each in portions through alternate intermediate cell sections, which comprises an anode section, a cathode section, a plurality of intermediate sections formed by frames separated by single alternate cation- and anion-exchange membranes, each of said frames having a first slit, a second slit, and a first and second aperture, said apertures extending through the thickness of the frames, said first slit forming a passage from the interior of the frame to said first aperture, and said second slit forming a passage from the interior of the frame to an exterior edge thereof, apertures through the thickness of said membranes engaging with the apertures in said frames, alternate frames having their second slits extending in different directions, to provide outlets for the un-

| Run No. | 1 | 2 | 3 | 4 | 5 | 6 | 7 | 8 | 9 | 10 |
|---|---|---|---|---|---|---|---|---|---|---|
| Operational Data: | | | | | | | | | | |
| Effluent Rates, Depleted Stream | 12.85 | 9.46 | 5.15 | 5.13 | 5.08 | 4.05 | 9.45 | 12.80 | 12.72 | 12.78 |
| (G. P. H.), Concentrated Stream | 6.60 | 6.69 | 5.10 | 5.17 | 5.14 | 5.12 | 6.68 | 7.03 | 6.85 | 6.64 |
| Applied Voltage | 36 | 36.5 | 37 | 28.5 | 13.2 | 36 | 36 | 36 | 28 | 13 |
| Amperage | 3.09 | 2.60 | 1.79 | 1.50 | 1.18 | 1.95 | 3.36 | 4.01 | 3.59 | 2.10 |
| Power (K. w. H./1,000 gal. Depleted Effluent) | 8.66 | 10.0 | 13.1 | 8.3 | 3.07 | 13.9 | 12.8 | 11.27 | 7.91 | 2.14 |
| Current Efficiency (Percent) | 78.8 | 79.6 | 74.5 | 77.2 | 86.0 | 76.3 | 80.0 | 82.8 | 85.2 | 89.7 |
| Analytical Data: | | | | | | | | | | |
| Feed Concentration, Depl. | 1,591 | 1,591 | 1,593 | 1,593 | 1,593 | 1,593 | 1,606 | 1,599 | 1,599 | 1,599 |
| (p. p. m. as $CaCO_3$), Concen. | 1,630 | 1,593 | 1,593 | 1,593 | 1,593 | 1,587 | 1,593 | 1,612 | 1,612 | 1,612 |
| Effl. Concentration, Depl. | 658 | 513 | 314 | 478 | 610 | 140 | 204 | 323 | 413 | 872 |
| (p. p. m. as $CaCO_3$), Concen. | 3,440 | 3,070 | 2,930 | 2,660 | 2,570 | 3,050 | 3,580 | 3,910 | 3,770 | 2,935 | restricted flow of effluent from each section, and troughs provided below said second slits in alternate frames, one on each side of the assembly for collection of freely falling effluent from said alternate intermediate cell sections.

References Cited in the file of this patent

UNITED STATES PATENTS

| | | |
|---|---|---|
| 1,156,715 | Schwerin | Oct. 12, 1915 |
| 1,849,622 | Heibig | Mar. 15, 1932 |
| 2,049,828 | Stevens | Aug. 4, 1936 |
| 2,182,391 | Skolnik | Dec. 5, 1939 |
| 2,708,658 | Rosenberg | May 17, 1955 |

FOREIGN PATENTS

| | | |
|---|---|---|
| 416,658 | Italy | Dec. 10, 1946 |

OTHER REFERENCES

Serial No. 276,706, Grandel (A. P. C.), published May 18, 1943.

"Amberplex Ion Permeable Membranes," Rhom & Haas Co., Philadelphia, Pa. (1952), pp. 19, 22 and 23.